US011366915B2

(12) United States Patent
Zhu

(10) Patent No.: US 11,366,915 B2
(45) Date of Patent: Jun. 21, 2022

(54) METHOD AND SYSTEM FOR DOCUMENT AUTHORIZATION AND DISTRIBUTION

(71) Applicant: LEDGENDD TECHNOLOGIES INC., Ashburn, VA (US)

(72) Inventor: Wen Zhu, McLean, VA (US)

(73) Assignee: LEDGENDD TECHNOLOGIES INC., Ashburn, VA (US)

( * ) Notice: Subject to any disclaimer, the term of this patent is extended or adjusted under 35 U.S.C. 154(b) by 224 days.

(21) Appl. No.: 16/854,685

(22) Filed: Apr. 21, 2020

(65) Prior Publication Data

US 2021/0326464 A1     Oct. 21, 2021

(51) Int. Cl.
| | |
|---|---|
| G06F 21/62 | (2013.01) |
| G06F 16/93 | (2019.01) |
| G06F 16/954 | (2019.01) |
| G06F 21/60 | (2013.01) |

(52) U.S. Cl.
CPC .......... *G06F 21/6209* (2013.01); *G06F 16/93* (2019.01); *G06F 16/954* (2019.01); *G06F 21/602* (2013.01)

(58) Field of Classification Search
CPC .... G06F 21/6209; G06F 21/602; G06F 16/93; G06F 16/954
See application file for complete search history.

(56) References Cited

U.S. PATENT DOCUMENTS

| | | | | |
|---|---|---|---|---|
| 11,170,092 | B1 * | 11/2021 | Liang | H04L 9/3239 |
| 2017/0132625 | A1 * | 5/2017 | Kennedy | G06F 16/2379 |
| 2017/0220815 | A1 * | 8/2017 | Ansari | G06Q 20/02 |
| 2019/0327080 | A1 * | 10/2019 | Liu | G06F 21/6218 |
| 2020/0125750 | A1 * | 4/2020 | Hatami | G06F 21/6236 |
| 2020/0134221 | A1 * | 4/2020 | Su | H04L 9/0637 |
| 2020/0380090 | A1 * | 12/2020 | Marion | H04L 9/3239 |

* cited by examiner

*Primary Examiner* — Vance M Little
(74) *Attorney, Agent, or Firm* — Anova Law Group, PLLC

(57) ABSTRACT

A method for document authorization and distribution is provided. The method is based on a system including a repository server, communicating with or hosting a repository; a blockchain network, including a plurality of peers; and a plurality of user devices, each communicating with the repository server or the blockchain network. The repository contains a plurality of published documents. A plurality of document publication records, a plurality of document dissemination records, and an access control smart contract are distributed over the peers. The method includes: when an access request for a published document is submitted by a user from a user device, retrieving the published document; verifying the document access right; encrypting the published document with a document password encrypted using the user's public key; signing and posting a document dissemination record, including the document password; and placing the document contents and a signed document hash value in a container document.

20 Claims, 5 Drawing Sheets

METHOD AND SYSTEM FOR DOCUMENT AUTHORIZATION AND DISTRIBUTION

GOVERNMENT RIGHTS

This invention was made with Government support under Contract No. SP4701-19-P-0019, awarded by the Defense Logistics Agency, United States Depart of Defense. The U.S. Government has certain rights in this invention.

FIELD OF THE DISCLOSURE

The present disclosure relates generally to the technical field of multimedia management and communication, and more particularly, to a method and a system for document authorization and distribution.

BACKGROUND

As the demands on exchanging digital document such as video, audio, image, text, etc. electronically keep increasing, how to quickly verify the access right and efficiently distribute the corresponding contents to an authorized party is of broad interest to the e-commerce industry.

Currently, to enforce the copyright protection for digital documents, individual content providers often choose to distribute digital documents in a proprietary format and require clients to run mobile code for document access authorization. However, as the need for secure document distribution extends beyond traditional content providers, documents in an open format and embedded into hypertext markup language (HTML) files are highly desired for document management. In addition, because of the potential security risk due to running mobile code with other programs and applications on the client side, an alternative method for document access authorization is also desired.

In recent years, blockchain technology has become an important method for storing, verifying, transmitting, and exchanging data through a private or public network. Specifically, the decentralized, distributed, and oftentimes public, digital ledger of the blockchain technology provides an ideal platform for document management and distribution in an enterprise or a consortium of enterprises. The disclosed method and system for document authorization and distribution based on the blockchain technology are directed to solve one or more problems set forth above and other problems in the art.

BRIEF SUMMARY OF THE DISCLOSURE

One aspect or embodiment of the present disclosure includes a method for document authorization and distribution, based on a system including a repository server; a blockchain network; and a plurality of user devices each communicatively connected with the blockchain network or the repository server. The blockchain network includes a plurality of peers; a plurality of document publication records, a plurality of document dissemination records, and an access control smart contract are distributed over the plurality of peers; the repository server communicates with or hosts a repository through a user interface; the repository contains a plurality of published documents; and each document publication record distributed in the blockchain network corresponds to a published document and includes a signed document hash value. The method includes: in response to an access request for a published document, submitted by a first user from a user device to the repository server and containing a public key of the first user, retrieving, by the repository server, a document publication record corresponding to the published document from the blockchain network; determining, by the repository server, whether the first user is granted a document access right for accessing the published document; signing and posting, by the repository server, a document dissemination record referencing the document publication record and including the document password; and when determining that the first user is granted the document access right, encrypting, by the repository server, the published document with a document password, which is encrypted using the public key of the first user, and placing, by the repository server, document contents of the encrypted published document, along with a signed document hash value, in a container document on the user device.

Another aspect or embodiment of the present disclosure includes a method for document authorization and distribution, based on a system including a repository server; a blockchain network; and a plurality of user devices each communicatively connected with the blockchain network or the repository server. The blockchain network includes a plurality of peers; a plurality of document publication records, a plurality of document dissemination records, and an access control smart contract are distributed over the plurality of peers; the repository server communicates with or hosts a repository through a user interface; the repository contains a plurality of published documents; and each document publication record distributed in the blockchain network corresponds to a published document and includes a signed document hash value. The method includes: in response to a first user initiating an operation through the user interface of the repository server to send a document to a second user of a user device, granting, by the repository server, the second user a document access right for accessing the document; encrypting, by the repository server, the document with a document password, which is encrypted using a public key of the second user; posting, by the repository server, a document publication record corresponding to the document; signing and posting, by the repository server, a document dissemination record referencing the document publication record and including the document password; and placing, by the repository server, document contents of the encrypted document, along with a signed document hash value, in a container document on the user device.

Another aspect or embodiment of the present disclosure includes a system for document authorization and distribution. The system includes a repository server, communicating with or hosting a repository through a user interface; a blockchain network, including a plurality of peers; and a plurality of user devices, each communicatively connected with the blockchain network or the repository server. The repository contains a plurality of published documents. A plurality of document publication records, a plurality of document dissemination records, and an access control smart contract are distributed over the plurality of peers. Each document publication record distributed in the blockchain network corresponds to a published document and includes a signed document hash value. In response to an access request for a published document, submitted by a first user from a user device to the repository server and containing a public key of the first user, the repository server is configured to: retrieve a document publication record corresponding to the published document from the blockchain network; determine whether the first user is granted a document access right for accessing the published document; sign and post a document dissemination record referencing the document publication record and including the document password; when determining that the first user is granted the document access right, encrypt the published document with a document password, which is encrypted using the public key of the first user, and place document contents of the encrypted published document, along with a signed document hash value, in a container document on the user device.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

In existing technology, to enforce license terms, a content publisher usually distributes documents in a proprietary format to a client when the right of the client to access the documents is verified through execution of mobile code. That is, a program/application or part of a program/application needs to be executed on a local device. Because the environment of the local device that runs the mobile code may be potentially malicious, the verification of the access right may be vulnerable. In addition, the proprietary format of the documents transmitted through the delivery channel may also limit the application of the document distribution strategy.

Figure 1:
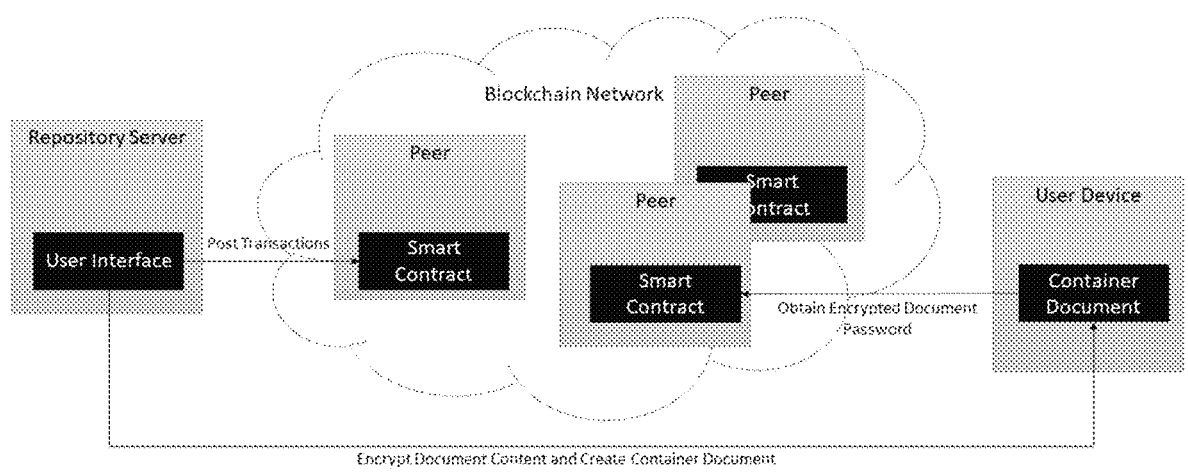
FIG. 1 illustrates a schematic diagram of an exemplary system for document authorization and distribution according to various embodiments of the present disclosure.
Figure 2:
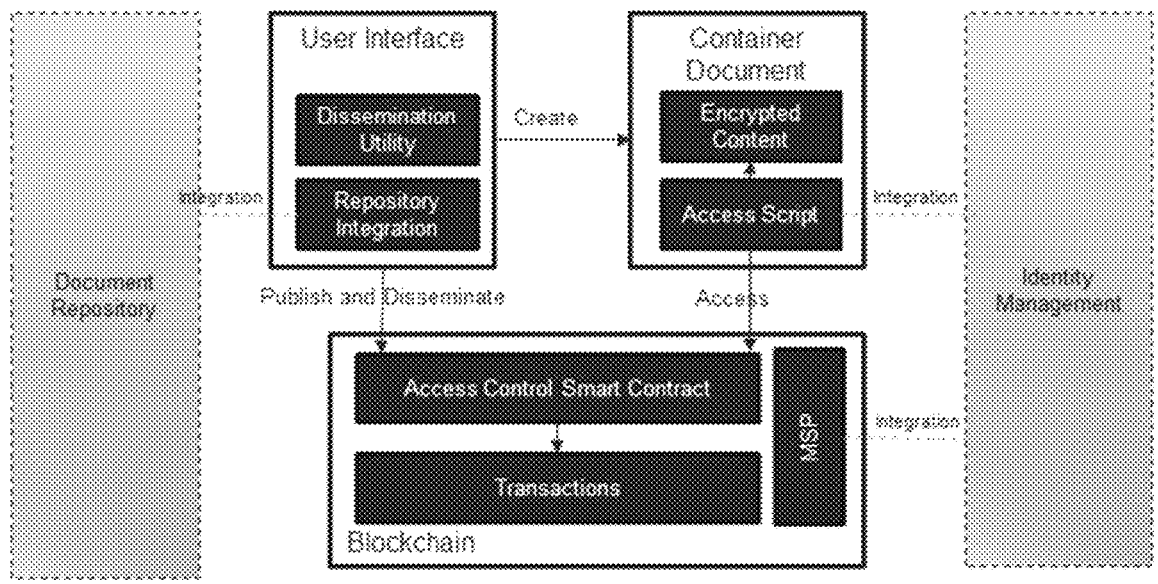
FIG. 2 illustrates a schematic block diagram of an exemplary method for document authorization and distribution according to various embodiments of the present disclosure.

The present disclosure provides a method and a system for document authorization and distribution based on the blockchain technology. FIG. 1 illustrates a schematic diagram of an exemplary system for document authorization and distribution according to various embodiments of the present disclosure. FIG. 2 illustrates a schematic block diagram of an exemplary method for document authorization and distribution according to various embodiments of the present disclosure.

Referring to FIGS. 1-2, the system for document authorization and distribution may include a repository server, a blockchain network, and a plurality of user devices. The blockchain network may include a plurality of peers (e.g., network devices). An access control smart contract and a plurality of transactions, including a plurality of document publication records and a plurality of document dissemination records, may be distributed over the plurality of peers of the blockchain network. The repository server may include a user interface, the repository server may communicate with or host a repository through the user interface, and the repository contains a plurality of published documents. For example, a document may be sent from the repository server to the repository as a published document, or the repository server may retrieve a published document from the repository when an access request is submitted by a user from a user device to the repository server. Moreover, each document publication record may correspond to a published document and include a signed document hash value; each user device of the plurality of user devices is communicatively connected with the blockchain network or the repository server. The method for document authorization and distribution may be applied to the system to authorize and distribute documents in response to user requests from the plurality of user devices.

In one embodiment, records related to document publication and dissemination, e.g. document publication records and document dissemination records, may be posted as transactions on the permissioned blockchain network, and the transactions may be used by the access control smart contract to make access control decisions. A document publication record may be created on the blockchain network corresponding to each published document in the repository, and may contain document metadata and a document hash value, signed by the submitter or the repository, such that a user may be able to quickly verify the authenticity and integrity of the document. The metadata may provide additional document information, such as a link to the authoritative repository. In order to grant document access to a user, a document dissemination record may be posted on the blockchain network for the intended user. The document dissemination record may contain more access control policies, such as an expiration date for document access privileges and whether redistribution is allowed, in addition to those specified in the document publication record. In one embodiment, the transactions distributed in the blockchain network may further include document recall records, and each document recall record may be posted on the blockchain network by the repository server or any other authoritative source to revoke corresponding document access privileges.

Further, each transaction may include document access policies. The document access policies may be defined at the document level, and correspondingly, standard-based verifiable claims about a user may be checked before document access is granted. Alternatively, the document access policies may be defined at the user level, that is, access control settings may be defined for each individual user.

The access control smart contract may determine whether an access should be granted based on the document access policies contained in various transactions on the blockchain network. In one embodiment, the access control smart contract may make access control decisions based on metadata in one or more transactions.

It should be noted that the blockchain network may include one or more network devices (e.g., peers). The one or more network devices may be connected to each other through a communication network, and each network device may include one or more processors. The plurality of transactions and the access control smart contract may be distributed over the one or more network devices in a decentralized manner.

The container document may include a blockchain network access script for obtaining a document password from the blockchain network. The document password may be placed in the dissemination record and encrypted using the public key of the user. Moreover, the encrypted document contents may be embedded in the container document. In one embodiment, the container document may be in a hypertext markup language (HTML) format, and may use a public key infrastructure (PKI) to protect the document contents being distributed. When a user is verified to be the intended recipient, the container document may locally decrypt the document password obtained from the access control smart contract on the blockchain network. Therefore, according to the disclosed method and system, the access control responsibilities are shared by the container document and the blockchain network.

It should be noted that to ensure the confidentiality, the document contents are always encrypted with a document password, and the document password may be placed in the dissemination record and further encrypted using the public key of the user. It should also be noted that while the blockchain peers are trusted to collectively enforce document access policies, the encryption according to various embodiments of the present disclosure may be able to guard against accidental leak of information at individual peers.

Further, when a user submits an access request for a document using a user device, the access request may be digitally signed and logged in the blockchain network.

In one embodiment, the blockchain network may further include a membership service provider (MSP), and the access control smart contract may evaluate each access request based on the identity of the user as determined by the MSP. Alternatively, in other embodiments, the access control smart contract may evaluate each access request based on verifiable claims signed by proper authorities.

It should be noted that the users and peers participating document authorization and distribution may have pre-determined membership at various levels of trust. For example, a user requesting a document, a submitter posting a document, and an analyst monitoring and authorizing documents and transactions may all be considered as users participating document authorization and distribution. Moreover, users requesting documents may have different levels of right, and the level of the right for each user may be changeable when certain membership criteria, depending on the actual applications, are satisfied.

Figure 3:
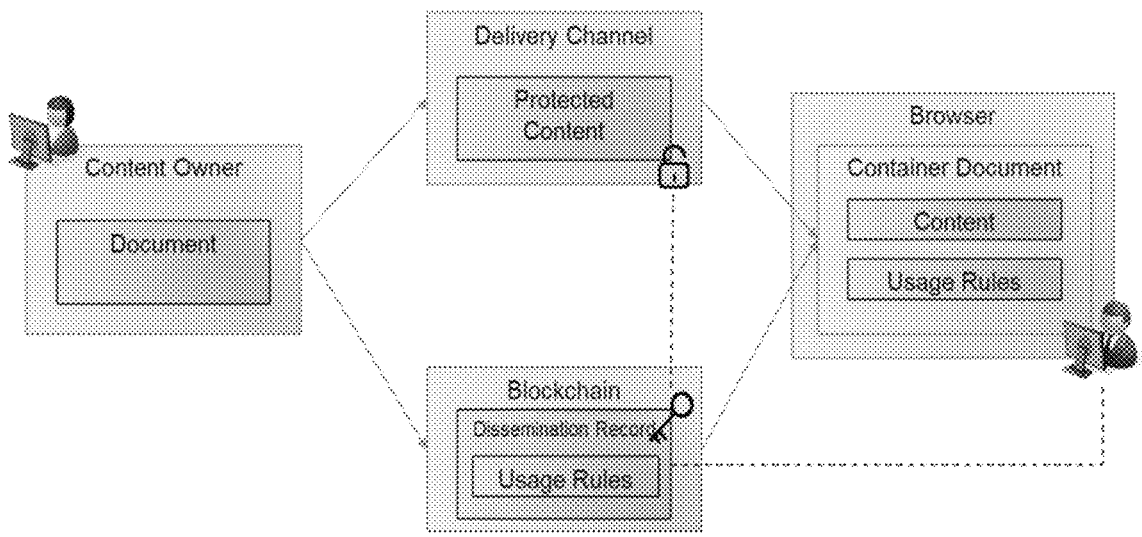
FIG. 3 illustrates a schematic diagram of an exemplary solution for digital right management according to various embodiments of the present disclosure.

According to the disclosed method and system, the container document may be able to enforce access control policies in a distributed manner without relying on mobile code. FIG. 3 illustrates a schematic diagram of an exemplary solution for digital right management (DRM) according to various embodiments of the present disclosure. Referring to FIG. 3, the solution for DRM may automate the user's interaction with the blockchain infrastructure. For example, in response to an access request from a verified user, using a user device, to access a document, the corresponding document contents may be encrypted with a document password and may be transmitted through a delivery channel. That is, the document contents may be protected by the document password, such that the document contents may only be accessible when a correct document password is provided. In one embodiment, the protected contents in the container document may be in an HTML-based format, and correspondingly, the contents may be rendered and displayed in a standard browser. That is, the protected document contents may be in an open document format, thereby avoiding the use of proprietary format for display. However, in order to display the protected document contents in the browser, a content decryption process may be required. As illustrated in FIG. 3, the content description process may be encapsulated such that the document password is not shared with the user. Therefore, by encapsulating the content decryption process, the user's ability to redistribute a decrypted version of document and bypass the access control mechanism may be limited, and the restrictions on the content use may be enforced. For example, saving the document contents to a local storage medium or printing the document contents may be prevented.

In one embodiment, an HTML-based container document may include the following exemplary components: document contents, encrypted with a native document password, and serialized in a standard format such as Base64 encoding; a document hash value, signed by the repository server or a submitter, for integrity verification; a reference to the document dissemination record on the blockchain network; and a blockchain access script, invoked when the container document is loaded in a browser.

Figure 4:
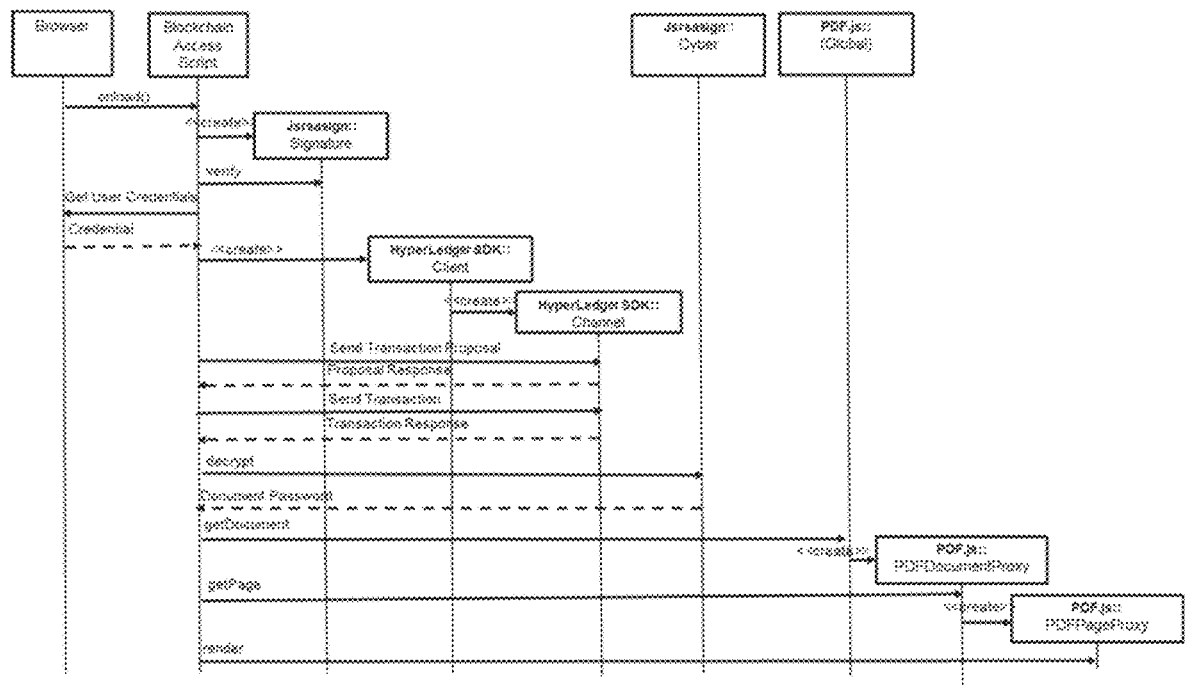
FIG. 4 illustrates a schematic functional diagram of an exemplary blockchain access script according to various embodiments of the present disclosure.

FIG. 4 illustrates a schematic functional diagram of an exemplary blockchain access script according to various embodiments of the present disclosure. Referring to FIG. 4, in one embodiment, the blockchain access script may be written in JavaScript. When the blockchain access script is executed, the following exemplary operations may be performed.

The integrity of the document may be confirmed by verifying the signed document hash value. The access control smart contract may be invoked to obtain the document password using a digital certificate containing the public key of the user (e.g., an X.509 digital certificate). The document password may be decrypted using a private key of the user. The document contents may be decrypted by the container document using the document password, and the decrypted document contents may be further rendered in the browser of the user device using a third-party library.

According to the disclosed method and system for document authorization and distribution, a container document is prepared by encrypting the document contents with a document password that is encrypted using the credentials of the user. When a user submits an access request for the document, the document password may be automatically queried using the credentials of the user. Therefore, the encapsulated container document prevents sharing the document password with the user. As such, the user's ability to redistribute a decrypted version of document and bypass the access control mechanism may be limited, and the restrictions on the content use may be enforced.

Further, by adopting an HTML format for the container document and a blockchain architecture for transaction recording, the disclosed method and system avoid using a proprietary format and is not limited to proprietary clients. Therefore, the disclosed method and system demonstrate a broad application scope.

The present disclosure provides a method for document authorization and distribution. The method may be based on a user interface, a blockchain network, and a repository. The user interface may include a web-based dissemination utility, which provides a communication platform for the repository or a document submitter to interact with the blockchain network. The repository may include a plurality of published documents. The blockchain network may include a plurality of transactions and an access control smart contract. In one embodiment, the plurality of transactions may include a plurality of document publication records and a plurality of document dissemination records. Each document publication record distributed in the blockchain network may correspond to a published document in the repository. In other embodiments, the plurality of transactions may further include a plurality of document recall records. The access control smart contract may make access control decisions using the plurality of transactions.

It should be noted that the blockchain network may include one or more network devices (e.g., peers). The one or more network devices may be connected to each other through a communication network, and each network device may include one or more processors. The plurality of transactions and the access control smart contract may be distributed over the one or more network devices in a decentralized manner.

Figure 5:
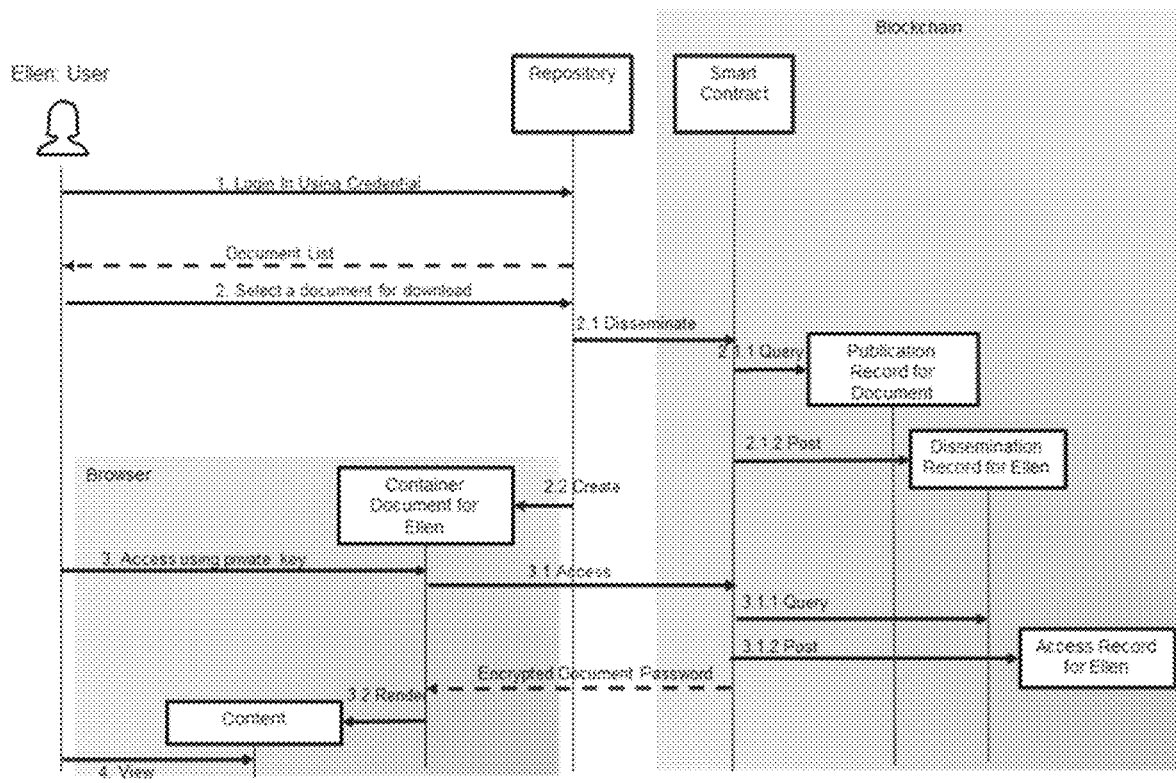
FIG. 5 illustrates a schematic diagram of a process of downloading document included in an exemplary method according to various embodiments of the present disclosure.

FIG. 5 illustrates a schematic diagram of a process of downloading document included in an exemplary method according to various embodiments of the present disclosure. Referring to FIG. 5, in one embodiment, a registered user, e.g. Ellen, of a repository may search for and download a limited-access document. In response to the system receiving an access request for a published document submitted by the registered user from a user device to the repository server, the method for document authorization and distribution may include the following exemplary operations.

First, the repository server may determine whether the user is granted a document access right for accessing the published document, and may retrieve a document publication record corresponding to the published document. For example, the repository server may invoke the access control smart contract to determine whether the user satisfies the access control policies of the published document based on the user's digital certificate; and when the user satisfies the access control policies, the repository server may then determine that the user is granted a document access right for accessing the published document.

When it is determined that the user is granted the document access right, the repository server may encrypt the published document with a document password and also configure additional security features such as adding a watermark. In one embodiment, the document password may be a one-time password, encrypted using the public key of the user.

Further, the repository server may serialize the document contents of the published document and place the document contents in a container document on the user device along with a signed document hash value for integrity check. It should be noted that the container document may be an executable app that can be downloaded to and executed on a user device. Because the container document is protected by the document password, acquiring the document password may be required when executing the container document to decrypt the document contents. As such, the security of the document contents may be enforced.

Moreover, the repository server may sign and post a document dissemination record, referencing the document publication record, on the blockchain network. In one embodiment, the document dissemination record may include the document password, encrypted using the public key of the user, and additional access control metadata such as an expiration date, etc.

However, when it is determined that the user has not been granted the document access right, the repository server may, instead of encrypting the published document with a document password, send an authorization-invalid message to the user device to indicate that accessing the published document by the user is unauthorized.

Further, the container document may be downloaded to the user device, when the user initiates an operation to open the downloaded container document in a browser of the user device, the method may further include the following exemplary operations.

First, the container document may verify the signed document hash value to ensure that the document has not been tempered with. That is, the container document may verify the signed document hash value to confirm the document integrity.

Further, the container document may invoke the access control smart contract to obtain the document password using the public key of the user.

The container document may invoke the access control smart contract to determine whether the document access right granted to the user is still valid when the user initiates an operation to open the downloaded container document. When it is determined that the document access right is valid, the access control smart contract may grant the access by providing the document password and post an access record on the blockchain network to indicate that the user has accessed the document. Correspondingly, a plurality of access records may be distributed over the plurality of peers of the blockchain network.

After obtaining the document password, the container document may decrypt the document contents in the container document using the document password, and then the decrypted document contents may be rendered in the browser using a third-party library. As such, the user completes the process of downloading the requested document from the repository.

However, when it is determined that the document access right previously granted to the user is no longer valid, the container document may send an access-right-invalid message to the user device to indicate that the document access right is now invalid.

Figure 6:
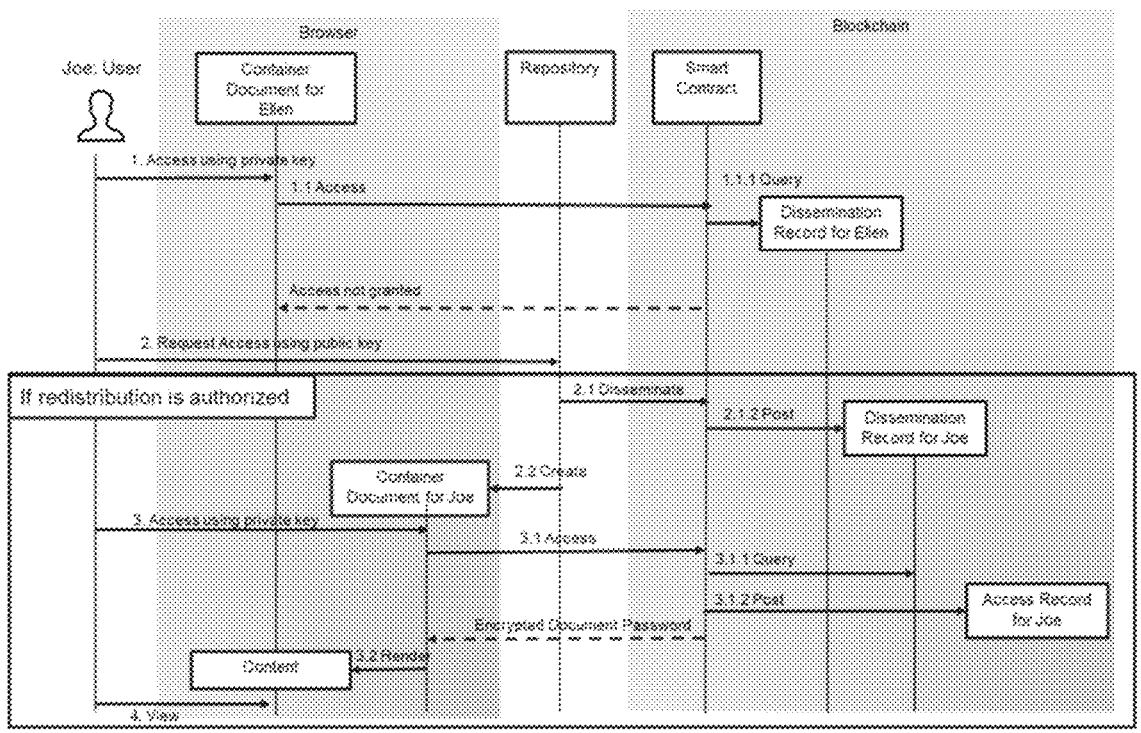
FIG. 6 illustrates a schematic diagram of an offline process of redistributing document included in an exemplary method according to various embodiments of the present disclosure.

FIG. 6 illustrates a schematic diagram of an offline process of redistributing document included in an exemplary method according to various embodiments of the present disclosure. Referring to FIG. 6, in one embodiment, after a container document was downloaded by a first user, e.g. Ellen, of the system, the container document may be forwarded to a second user, e.g. Joe, by the first user. However, the container document is created for the first user, and thus the contents in container document are protected by a document password encrypted using the public key of the first user. Therefore, when the second user opens the container document in a browser of a user device, the document password will not be decrypted as only the private key of the second user is provided. As a result, the document contents may not be rendered and displayed for the second user. Instead, the method may include submitting an access request for the document included in the forwarded container document using the credential of the second user, e.g. the public key of the second user, and in response to the access request, the method may further include the exemplary operations in the embodiments described above. That is, a new container document, containing the document encrypted with a document password which is further encrypted using the public key of the second user, may be created for the second user. Therefore, when a container document is forwarded from a first user with access privileges to a second user, a new container document may be created based on the credentials of the second user. As such, the restrictions on the content use may be enforced.

Figure 7:
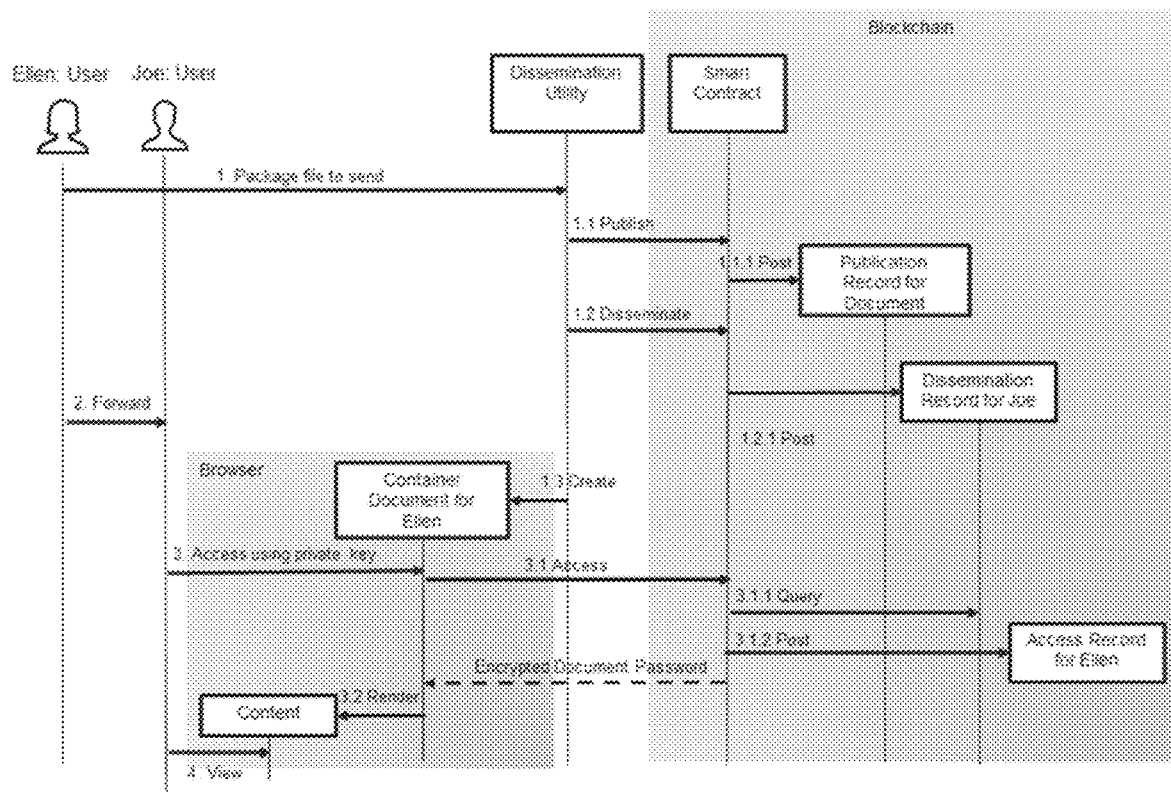
FIG. 7 illustrates a schematic diagram of a process of directly sending a document from one user to another user included in an exemplary method according to various embodiments of the present disclosure.

FIG. 7 illustrates a schematic diagram of a process of directly sending a document from one user to another user included in an exemplary method according to various embodiments of the present disclosure. Referring to FIG. 7, in one embodiment, a first user, e.g. Ellen, of the system may send a document directly to a second user, e.g. Joe, using the web-based dissemination utility in the repository server of the system. The method for document authorization and distribution may include the following exemplary operations. After receiving a request from the first user to package a file, the web-based dissemination utility of the user interface may grant the second user a document access right for accessing the document; package the document, along with the signed document hash value, into a container document with a document password encrypted using the public key of the second user; and further post two transactions on the blockchain network: a document publication record corresponding to the document and a document dissemination record referencing the second user. As such, the container document may be prepared for the second user to download and offline distribute. Moreover, for the detailed operations in response to the second user initiating an operation to open the container document in a browser, reference may be made to the corresponding content in various embodiments provided above.

Figure 8:
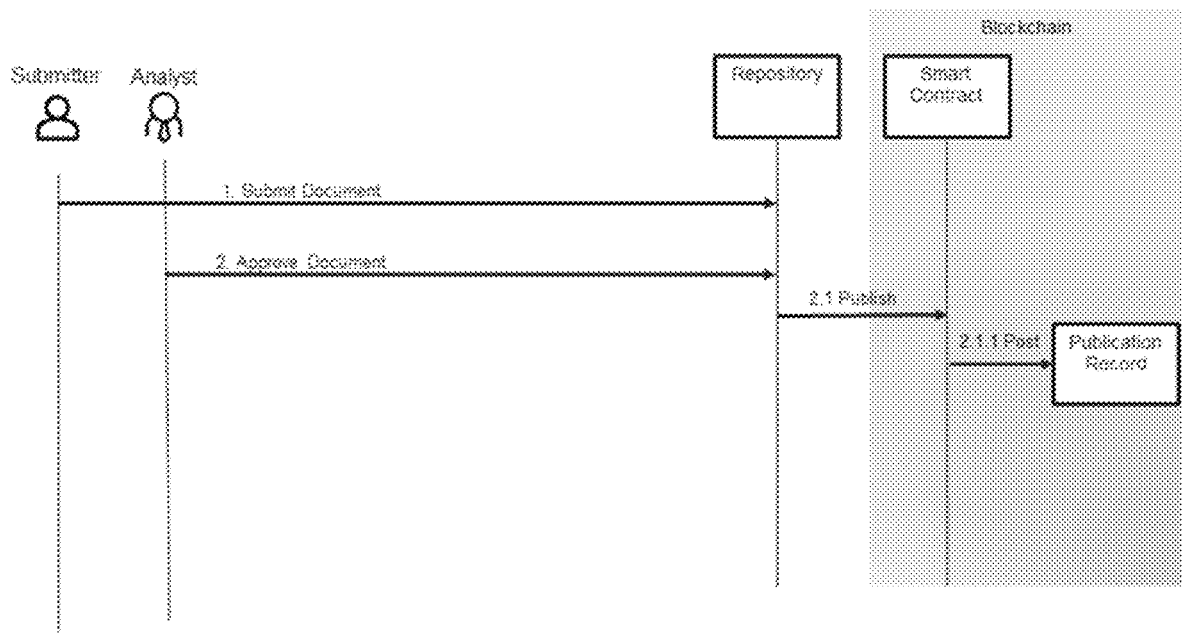
FIG. 8 illustrates a schematic diagram of a process of submitting and publishing document included in an exemplary method according to various embodiments of the present disclosure.

FIG. 8 illustrates a schematic diagram of a process of submitting and publishing document included in an exemplary method according to various embodiments of the present disclosure. Referring to FIG. 8, in one embodiment, a submitter may submit and publish a document using the system, and correspondingly, after the submitter submits the document, the method for document authorization and distribution may include the following exemplary operations. An analyst may approve the document submission through the web-based dissemination utility of the user interface in the repository server, and the web-based dissemination utility may post a transaction on the blockchain network: a document publication record corresponding to the document. The document publication record may contain document metadata and a document hash value, signed by the submitter or the repository, such that a user may be able to quickly verify the authenticity and integrity of the document. The metadata may provide additional document information, such as a link to the authoritative repository. While the document publication record does not contain access control lists (ACL), the access control policies may require certain kinds of user credentials. In addition, the document may be stored as a published document in the repository for future access upon request.

Figure 9:
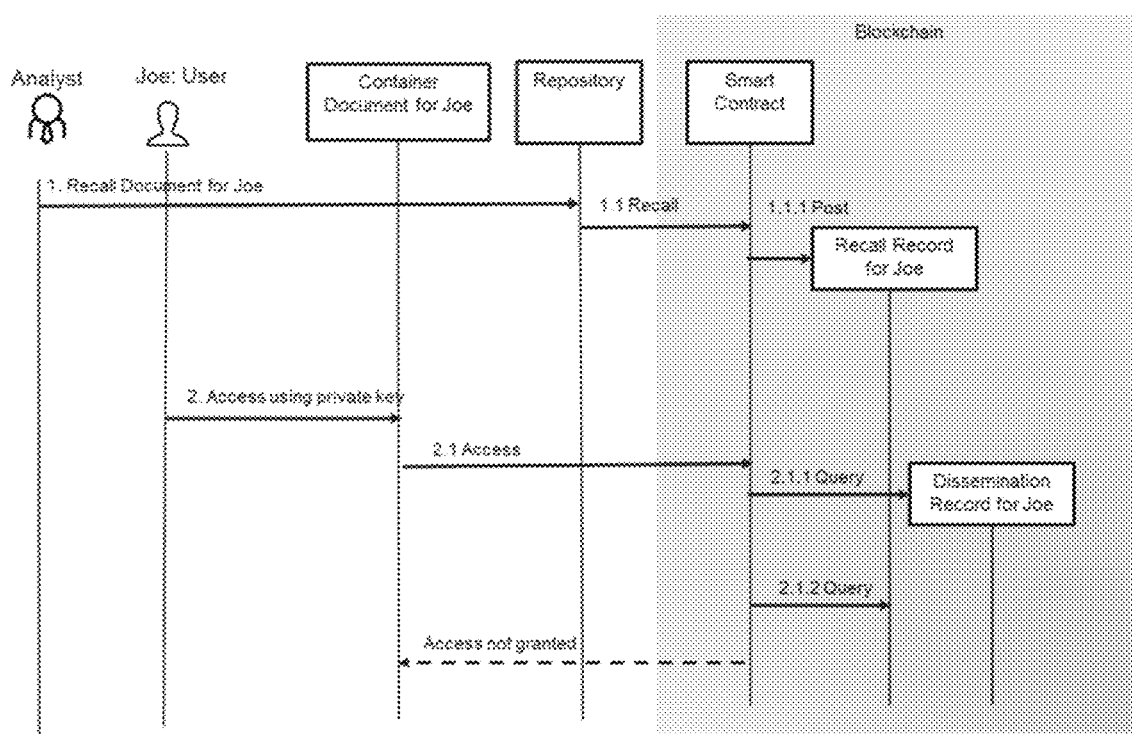
FIG. 9 illustrates a schematic diagram of a process of recalling document included in an exemplary method according to various embodiments of the present disclosure.

FIG. 9 illustrates a schematic diagram of a process of recalling document included in an exemplary method according to various embodiments of the present disclosure. Referring to FIG. 9, in one embodiment, after a document is granted to a user, e.g. Joe, the document access right of the user may be revoked or may expire, and correspondingly, the method for document authorization and distribution may include the following exemplary actions. A document recall record may be posted on the blockchain network by the repository server. The document recall record may be posted by the repository server when revoking the document access right is instructed by an analyst or any other authoritative source or when the document access right expires. The document recall record may be directed to the document dissemination record generated when the user accesses the document.

When the user attempts to open the previously downloaded document, an access request may be submitted together with the public key of the user, and the container document may attempt to invoke the access control smart contract to retrieve the document password. The smart control may first determine whether the document access right granted to the user is still valid by detecting the presence of the document recall record. For example, the access control smart contract may detect that a document recall record is directed to the document dissemination record. Correspondingly, the access control smart contract may determine that the document access right is now invalid and an access-right-invalid message may be sent out to instruct the user to contact the sender for more information. As such, the document contents that are previously accessible for the user may not be decrypted and rendered.

According to the disclosed method for document authorization and distribution, a container document is prepared by encrypting the document contents with a document password that is encrypted using the credentials of the user. When a user submits an access request for the document, the document password may be automatically queried using the credentials of the user. Therefore, the encapsulated container document prevents sharing the document password with the user. As such, the user's ability to redistribute a decrypted version of document and bypass the access control mechanism may be limited, and the restrictions on the content use may be enforced.

Further, by adopting an HTML format for the container document and a blockchain architecture for transaction recording, the disclosed method avoids using a proprietary format and is not limited to proprietary clients. Therefore, the disclosed method demonstrates a broad application scope.

Compared to existing methods and systems for document authorization and distribution, the disclosed method and system demonstrate the following exemplary capabilities: document authentication and integrity verification, allowing a user to easily verify that a document is from or endorsed by an authoritative source and has not been tempered with; continual document access control, enabling an organization to exercise fine-gained control over documents disseminated, including revoking access rights and limiting the ability to redistribute even after the document has left the enclave; temper-resistance access logs, maintained for document access and including when the document is redistributed.

It should be noted that for illustrative purposes, only a limited number of users, submitters, and analysts are described in the embodiments of the present disclosure. In actual applications, the disclosed system may include any appropriate number of users, analysts, submitters, and other relevant entities. In addition, data exchange and information transmission within the disclosed system are implemented through intranet or internet communication.

Those skilled in the art may further realize that the units and algorithm steps of the examples described with reference to the embodiments disclosed herein can be implemented by electronic hardware, computer software, or a combination of the two. To clearly illustrate the interchangeability of hardware and software, the components and steps of various examples have been generally described in terms of their functionality. Whether these functions are implemented by hardware or software depends on the specific application and the design constraints of the technical solutions. A person skilled in the art may use different methods to implement the described functions for each particular application. However, such implementation should not be considered as beyond the scope of the present disclosure.

The steps of the method or algorithm described in the embodiments disclosed herein may be implemented directly by hardware, a processor-executable software module, or a combination of the two. The software module may be located in random access memories (RAMs), internal memories, read-only memories (ROMs), electrically programmable ROMs, electrically erasable programmable ROM, registers, removable disks, CD-ROMs, or other storage media that are well known in the field.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A method for document authorization and distribution, based on a system including a repository server; a blockchain network; and a plurality of user devices each communicatively connected with the blockchain network and the repository server, wherein the blockchain network includes a plurality of peers; a plurality of document publication records, a plurality of document dissemination records, and an access control smart contract are distributed over the plurality of peers; the repository server communicates with or hosts a repository through a user interface; the repository contains a plurality of published documents; and each document publication record distributed in the blockchain network corresponds to a published document and includes a signed document hash value, the method comprising:
   in response to an access request for a published document, submitted by a first user from a user device to the repository server and containing a public key of the first user:
      retrieving, by the repository server, a document publication record corresponding to the published document from the blockchain network;
      determining, by the repository server, whether the first user is granted a document access right for accessing the published document;
      signing and posting, by the repository server, a document dissemination record referencing the document publication record and including a document password; and
      when determining that the first user is granted the document access right, encrypting, by the repository server, the published document with the document password, which is encrypted using the public key of the first user, and placing, by the repository server, document contents of the encrypted published document, along with a signed document hash value, in a container document on the user device.

2. The method according to claim 1, further including:
   in response to the first user opening the container document in a browser of the user device using a private key of the first user:
      verifying, by the container document, the signed document hash value to confirm document integrity;
      invoking, by the container document, the access control smart contract to obtain the document password using the public key of the first user, including:
         determining, by the access control smart contract, whether the document access right granted to the first user is valid, and
         when determining that the document access right granted to the first user is valid, returning, by the access control smart contract, the document password encrypted using the public key of the first user; and
      decrypting, by the container document, the document password using the private key of the first user; and
      decrypting, by the container document, the document contents using the document password.

3. The method according to claim 1, wherein:
   the access request is submitted when the first user initiates an operation to open a forwarded container document from a second user, wherein the forwarded container document contains the published document encrypted with the document password, which is encrypted using a public key of the second user.

4. The method according to claim 1, wherein:
   the document publication record corresponding to the published document further includes document metadata, the document metadata providing document information, including a link to the repository; and
   the document dissemination record, signed and posted by the repository server, contains access control policies, including an expiration date for document access privileges and whether redistribution is allowed.

5. The method according to claim 1, wherein when encrypting the published document with the document password, the method further includes:
   configuring, by the repository server, security features other than the document password, including adding a watermark.

6. The method according to claim 1, when determining that the first user is not granted the document access right, further including:
   sending, by the repository server, an authorization-invalid message to the user device to indicate that accessing the published document by the first user is unauthorized.

7. The method according to claim 2, wherein:
   a plurality of access records is distributed over the plurality of peers of the blockchain network;
   when invoking the access control smart contract to obtain the document password using the public key of the first user, the method further includes posting, by the access control smart contract, an access record on the blockchain network to indicate that the first user has accessed the published document; and
   after decrypting the document contents using the document password, the method further includes rendering, by the user device, the decrypted document contents in the browser.

8. The method according to claim 2, wherein the container document is in a hypertext markup language (HTML) format, and includes:
- the document contents, encrypted with the document password and serialized in a standard format;
- the document hash value, signed by the repository or a submitter, for integrity verification;
- a reference to the document dissemination record on the blockchain network; and
- a blockchain access script, invoked when the container document is loaded in the browser, wherein the blockchain access script is executed to:
  - verify the signed document hash value to confirm the document integrity,
  - invoke the access control smart contract to obtain the document password using the public key of the first user,
  - decrypt the document password using the private key of the first user, and
  - decrypt the document contents using the document password.

9. The method according to claim 2, wherein:
- a plurality of document recall records is distributed over the plurality of peers of the blockchain network,
- in response to the document access right of the first user expiring or being revoked, the method further includes:
  - posting, by the repository server, a document recall record on the blockchain network, wherein the document recall record is directed to the document dissemination record, and
  - determining, by the access control smart contract, whether the document access right granted to the first user is valid includes:
    - detecting, by the access control smart contract, whether a document recall record is directed to the document dissemination record;
    - in response to the access control smart contract detecting that no document recall record is directed to the document dissemination record, determining, by the access control smart contract, that the document access right granted to the first user is valid; and
    - in response to the access control smart contract detecting that a document recall record is directed to the document dissemination record, determining, by the access control smart contract, that the document access right granted to the first user is invalid.

10. The method according to claim 9, in response to determining, by the access control smart contract, that the document access right granted to the first user is invalid, further including:
- sending, by the container document, an access-right-invalid message to the user device to indicate that the document access right granted to the first user is now invalid.

11. A method for document authorization and distribution, based on a system including a repository server; a blockchain network; and a plurality of user devices each communicatively connected with the blockchain network and the repository server, wherein the blockchain network includes a plurality of peers; a plurality of document publication records, a plurality of document dissemination records, and an access control smart contract are distributed over the plurality of peers; the repository server communicates with or hosts a repository through a user interface; the repository contains a plurality of published documents; and each document publication record distributed in the blockchain network corresponds to a published document and includes a signed document hash value, the method comprising:
- in response to a first user initiating an operation through the user interface of the repository server to send a document to a second user of a user device:
  - granting, by the repository server, the second user a document access right for accessing the document;
  - encrypting, by the repository server, the document with a document password, which is encrypted using a public key of the second user;
  - posting, by the repository server, a document publication record corresponding to the document;
  - signing and posting, by the repository server, a document dissemination record referencing the document publication record and including the document password; and
  - placing, by the repository server, document contents of the encrypted document, along with a signed document hash value, in a container document on the user device.

12. The method according to claim 11, further including:
- in response to the second user opening the container document in a browser of the user device using a private key of the second user:
  - verifying, by the container document, the signed document hash value to confirm document integrity;
  - invoking, by the container document, the access control smart contract to obtain the document password using the public key of the second user, including:
    - determining, by the access control smart contract, whether the document access right granted to the second user is valid, and
    - when determining that the document access right granted to the second user is valid, returning, by the access control smart contract, the document password encrypted using the public key of the second user; and
  - decrypting, by the container document, the document password using the private key of the second user; and decrypting, by the container document, the document contents using the document password.

13. The method according to claim 12, wherein the container document is in an HTML format, and includes:
- the document contents, encrypted with the document password and serialized in a standard format;
- the document hash value, signed by the first user, for integrity verification;
- a reference to the document dissemination record on the blockchain network; and
- a blockchain access script, invoked when the container document is loaded in the browser, wherein the blockchain access script is executed to:
  - verify the signed document hash value to confirm the document integrity;
  - invoke the access control smart contract to obtain the document password using the public key of the second user;
  - decrypt the document password using the private key of the second user; and
  - decrypt the document contents using the document password.

14. The method according to claim 12, wherein:
- a plurality of document recall records is distributed over the plurality of peers of the blockchain network;
- in response to the document access right of the second user expiring or being revoked, the method further includes:

posting, by the repository server, a document recall record on the blockchain network, wherein the document recall record is directed to the document dissemination record, and determining, by the container document, whether the document access right granted to the second user is valid includes:
detecting, by the access control smart contract, whether a document recall record is directed to the document dissemination record;
in response to the access control smart contract detecting that no document recall record is directed to the document dissemination record, determining, by the access control smart contract, that the document access right granted to the second user is valid; and
in response to the access control smart contract detecting that a document recall record is directed to the document dissemination record, determining, by the access control smart contract, that the document access right granted to the second user is invalid.

15. A system for document authorization and distribution, comprising:
a repository server, communicating with or hosting a repository through a user interface;
a blockchain network, including a plurality of peers; and
a plurality of user devices, each communicatively connected with the blockchain network or the repository server, wherein:
the repository contains a plurality of published documents;
a plurality of document publication records, a plurality of document dissemination records, and an access control smart contract are distributed over the plurality of peers;
each document publication record distributed in the blockchain network corresponds to a published document and includes a signed document hash value; and
in response to an access request for a published document, submitted by a first user from a user device to the repository server and containing a public key of the first user, the repository server is configured to:
retrieve a document publication record corresponding to the published document from the blockchain network,
determine whether the first user is granted a document access right for accessing the published document,
sign and post a document dissemination record referencing the document publication record and including a document password, and
when determining that the first user is granted the document access right, encrypt the published document with the document password, which is encrypted using the public key of the first user, and place document contents of the encrypted published document, along with a signed document hash value, in a container document on the user device.

16. The system according to claim 15, wherein:
in response to the first user opening the container document in a browser of the user device using a private key of the first user, the container document is configured to:
verify the signed document hash value to confirm document integrity;
invoke the access control smart contract to determine whether the document access right granted to the first user is valid, and
when the access control smart contract determines that the document access right granted to the first user is valid and returns the document password encrypted using the public key of the first user, decrypt the document password using the private key of the first user; and decrypt the document contents using the document password, and
the access control smart contract is configured to:
determine whether the document access right granted to the first user is valid; and
when determining that the document access right granted to the first user is valid, return the document password encrypted using the public key of the first user.

17. The system according to claim 15, wherein:
the document publication record corresponding to the requested document further includes document metadata, the document metadata providing document information, including a link to the repository;
the document dissemination record, signed and posted by the repository server, contains access control policies, including an expiration date for document access privileges and whether redistribution is allowed;
the repository server is further configured to configure security features other than the document password, including a watermark; and
the container document further includes the configured security features other than the document password, including the watermark.

18. The system according to claim 16, wherein:
a plurality of access records is distributed over the plurality of peers of the blockchain network; and
when the access control smart contract is invoked to obtain the document password, the access control smart contract is configured to post an access record on the blockchain network to indicate that the first user has accessed the document.

19. The system according to claim 16, wherein the container document is in an HTML format, and includes:
the document contents, encrypted with the document password and serialized in a standard format;
the document hash value, signed by the repository server or a submitter, for integrity verification;
a reference to the document dissemination record on the blockchain network; and
a blockchain access script, invoked when the container document is loaded in a browser, and configured to:
verify the signed document hash value to confirm the document integrity;
invoke the access control smart contract to obtain the document password using the public key of the first user;
decrypt the document password using a private key of the first user; and
decrypt the document contents using the document password.

20. The system according to claim 16, wherein:
a plurality of document recall records is distributed over the plurality of peers of the blockchain network;
in response to the document access right of the first user expiring or being revoked, the repository server is configured to post a document recall record on the blockchain network, wherein the document recall record is directed to the document dissemination record; and when the access control smart contract determines whether the document access right granted to the first user is valid, the access control smart contract is configured to:

detect whether a document recall record is directed to the document dissemination record;

in response to the access control smart contract detecting that no document recall record is directed to the document dissemination record, determine that the document access right granted to the first user is valid; and in response to the access control smart contract detecting that a document recall record is directed to the document dissemination record, determine that the document access right granted to the first user is invalid.

* * * * *